United States Patent [19]
Lutz

[11] Patent Number: 5,829,542
[45] Date of Patent: Nov. 3, 1998

[54] MOTOR VEHICLE HAVING DRIVE ASSEMBLIES WITH VARIOUS TRACK DISTANCES

[75] Inventor: Dieter Lutz, Schweinfurt, Germany

[73] Assignee: Fichtel & Sachs AG, Schweinfurt, Germany

[21] Appl. No.: 490,848

[22] Filed: Jun. 15, 1995

[30] Foreign Application Priority Data

Jun. 18, 1994 [DE] Germany .......................... 44 21 425.1

[51] Int. Cl.$^6$ .................................................. B60K 1/00
[52] U.S. Cl. .............................. 180/65.6; 180/DIG. 906; 280/690; 280/149.1
[58] Field of Search ................................. 180/65.1, 65.6, 180/65.7, 380, DIG. 905, DIG. 906; 280/690, 112.2, 111, 112.1, 149.1

[56] References Cited

U.S. PATENT DOCUMENTS

| | | | |
|---|---|---|---|
| 1,251,749 | 1/1918 | Cilley | 180/65.6 |
| 1,664,305 | 3/1928 | McCleary | 180/65.6 |
| 1,728,889 | 9/1929 | Kemble | 180/65.6 X |
| 1,780,370 | 11/1930 | Tenney | 180/65.6 X |
| 2,798,565 | 7/1957 | Rosenthal et al. | 180/6.5 |
| 3,439,767 | 4/1969 | Lynes et al. | 180/65.6 X |
| 4,550,926 | 11/1985 | MacIsaac | 280/112.2 |
| 5,443,130 | 8/1995 | Tanaka et al. | 180/65.2 |

FOREIGN PATENT DOCUMENTS

| | | |
|---|---|---|
| 0249807 | 12/1987 | European Pat. Off. . |
| 0474058 | 3/1929 | Germany . |
| 8205258 | 7/1982 | Germany . |
| 3725620 | 2/1989 | Germany . |
| 4323599 | 10/1994 | Germany . |

OTHER PUBLICATIONS

VDI–Berichte No. 878; "Das elektrische Getriebe von Magnet–Motor für PKW and Omnibusse"; 1991; Dr. P. Ehrhard; pp. 611–622.

Primary Examiner—Brian L. Johnson
Assistant Examiner—Michael Mar
Attorney, Agent, or Firm—Nils H. Ljungman and Associates

[57] ABSTRACT

For the drive train of a motor vehicle, a drive train assembly can be used which comprises two operational components which are separate from one another, each of which comprises a motor and a transmission which faces the drive wheel to be driven. The transmission, which can be a spur gear transmission with a driven shaft part oriented eccentrically with respect to the axis of rotation of the motor device, or can be a planetary transmission, is located together with the motor device on a common support part, on which the driven shaft of the motor device and the driven shaft part of the transmission are also mounted. The transmission is coupled to the drive wheel by means of a universal joint propeller shaft. To install the transmission-side joints of the universal joint propeller shafts, even with short universal joint propeller shafts, in the vicinity of the instantaneous center of rotation of the drive wheel, the two components are connected to one another by means of an auxiliary frame and with the bolster of the drive axle system. Merely by adapting the auxiliary frame, which may also be a component of the bolster, the drive train can be adapted to meet the special requirements of the motor vehicle, without having to make extensive modifications to the design of the components. The component can thus be constructed using standardized transmission and motor components.

22 Claims, 5 Drawing Sheets

MOTOR VEHICLE HAVING DRIVE ASSEMBLIES WITH VARIOUS TRACK DISTANCES

BACKGROUND OF THE INVENTION

1. Field of the Invention

The present invention generally relates to a drive train for a pair of drive wheels which are common to a drive axle system of a motor vehicle, in particular of a car or truck. The drive wheels can be moved on the vehicle by wheel guides at least approximately in the vertical direction of the vehicle.

2. Background Information

Conventionally, the drive train of a motor vehicle provides the propelling action for the drive wheels of the motor vehicle. The vehicle has front and rear wheelsets, each comprising a right and left side wheel. The conventional drive train comprises a drive apparatus for delivering torque to at least a front wheel and a rear wheel on one side of the vehicle. The drive train comprises all the parts that generate power and transmit the power to the driving wheels. Such parts include the engine, the transmission, the driveline, the differential assembly, and the driving axles. The engine and transmission are mounted on the frame and the driving wheels are free to move up and down in the angularity of the line of drive. Therefore, flexibility is needed in the drive train, and such flexibility usually is provided by universal joints. The universal joint transmits torque and/or rotational motion from one shaft to another at fixed or varying angles. Universal joints at both ends of the drive shaft can compensate for changes in angularity of the driveline.

In some conventional drive trains, the driving axle must transfer driving power to the wheels and, at the same time, compensate for the steering action on turns. To solve this fluctuation problem, special universal joints known as constant velocity joints may be used.

In addition to line of drive problems caused by angularity of the drive shaft, the distance between the transmission output shaft and the drive pinion shaft is subject to change. This creates the need for some flexibility in the length of the drive shaft.

Conventionally, the drive wheels of a motor vehicle which are guided flexibly by means of their wheel guides on the vehicle body can have separate motors, which separate motors are rotationally connected to the corresponding drive wheels by means of universal-joint propeller shafts. The motors can be powered at least indirectly by an internal combustion engine.

The motors of such known drive assemblies are combined into one component which is elastically damped but is mounted on the vehicle body, essentially stationary relative to it. On the other hand, the three-dimensional position of the instantaneous axis of rotation of each drive wheel changes during its suspension movement. As a rule, the motor with the universal joint propeller shaft connecting the drive wheel must not only be able to execute a bending movement, but it must also allow for the differences in length which result during the bending movement. In conventional motor drive trains, an attempt is therefore made to place the motor-side joint of the universal joint propeller shaft as far as possible toward the center of the vehicle, since the bending angle and the longitudinal offset of the universal joint propeller shaft are smaller, the longer the universal joint propeller shaft can be made. In additional conventional drive trains, each of the two motors can be connected into one component, in which the transmission projects radially beyond the motor in its axis of rotation, and is located on the side of the motor farther from the corresponding drive wheel. In this manner, a niche is created, radially outboard of the motor and facing the drive wheel, in which niche the motor-side joint of the extended universal joint propeller shaft can be installed. The two motor components can be combined by means of their housings into a single unit, which is fastened as a unit to the vehicle. But the two components can also be installed individually and can be separated by some distance.

In yet another type of conventional drive train, such a motor vehicle can have motors corresponding to the individual drive wheels, whereby the motors can be combined into one component and can be located axially between the drive wheels. Each motor can face the drive wheel to be driven.

The objective of making the universal joint propeller shafts as long as possible, which is common to conventional drive assemblies, makes it necessary to locate the motor-side joints of the universal joint propeller shafts as close as possible to the longitudinal center plane of the vehicle, and makes it necessary to vary the housing designs for the motors and the transmission to suit the requirements of the specific vehicle, e.g. to respond to different requirements for clearance above the road surface and the kinematics of the wheel guides.

OBJECT OF THE INVENTION

The object of the present invention is to improve a drive train of the type explained above, so that only a low investment of time, effort and money is required to vary the components designed for the adaptation to the vehicle.

SUMMARY OF THE INVENTION

The present invention generally departs from a drive train of the type described further above, whereby the drive train can comprise two motors located axially next to one another between the drive wheels. Each of the motors can face the drive wheel closest to it and the motors can be connected into one unit. By means of a universal joint propeller shaft connected to an output shaft part of each, each motor can be in a driving connection with the closest drive wheel. The present invention teaches that such a drive train can be improved if each of the two motor units also preferably forms a mechanically operating unit which is separate from the other unit, and if the two components are held to one another and to the vehicle by means of an auxiliary frame which defines the axial distance between the two components.

The present invention, in accordance with at least one preferred embodiment departs from a drive train of a type such as that described further above, whereby the drive train can comprise two motors located axially next to one another between the drive wheels. Each of the motors can face the drive wheel closest to it and the motors can be connected into one unit with a transmission. By means of the transmission and a universal joint propeller shaft connected to an output shaft part of each of the transmissions, each motor can be in a driving connection with the closest drive wheel. The present invention teaches that such a drive assembly can be improved if each of the two motor-transmission units also preferably forms a mechanically operating unit which is separate from the other unit, and if the two components are held to one another and to the vehicle by means of an auxiliary frame which defines the axial distance between the two components.

In contrast to conventional drive assemblies, in which the universal joint propeller shafts are as long as possible, the present invention adopts another approach in an attempt to keep the influence of the drive wheel, as it changes its pitch on the wheel guide, as low as possible on the torque transmission behavior of the universal joint propeller shaft. In known drive assemblies, the instantaneous center of the wheel movement, guided by the wheel guide, rotating and changing pitch as the drive wheel changes pitch, travels along a three-dimensional path defined by the kinematics of the wheel guide. In accordance with the present invention, since the electric motor-transmission components are fixed in their three-dimensional position relative to one another and to the vehicle by an additional auxiliary frame, the motor-side joint of the universal joint propeller shaft can be optimally placed with respect to the path of the center of momentum of the wheel movement, without requiring structural modifications of the electric motor-transmission component as such. The component can therefore be constructed using standardized electric motors and transmissions. Essentially only the auxiliary frame needs to be adapted to the specific vehicle. Conventionally, the electric motor-transmission components are mounted jointly with the wheel guides on a bolster. In accordance with the present invention, the auxiliary frame can be provided in addition to the bolster, but it can also be formed by parts of the bolster itself. The mounting of the transmission-side joint of the universal joint propeller shaft can be appropriately accomplished by means of the pivot bearing of the transmission. With the pivot bearing, its driven shaft part can be mounted on a support piece which can form the base of the transmission, in particular a transmission housing. Even if, between the transmission-side joint of the universal joint propeller shaft and the driven side shaft part, it may be necessary to have an intermediate piece which can extend the driven shaft part axially, it is preferable, to hold the joint directly to the driven shaft part, to install the joint as close as possible to the pivot bearing of the driven shaft part.

The transmission can preferably be a planetary transmission, since on account of its coaxial structure, such a transmission can be relatively small, although it is designed for a high torque. Of the three transmission components of such a transmission, the sun wheel can be appropriately located on the driven shaft of the electric motor while, depending on the gearing reduction required of the transmission, the ring gear or the planet carrier, which can hold the planet wheels, can preferably form the output shaft part of the transmission to be connected to the universal joint propeller shaft. The third component of the transmission can be firmly connected to a support part of the transmission, on which the driven shaft portion can also be mounted, in particular by means of a roller bearing. In this case, the pivot bearing can be appropriately located on the side of the plane of rotation of the planet wheels facing axially away from the electric motor, so that it is essentially possible to install the transmission-side joint of the universal joint propeller shaft as close as possible to the pivot bearing.

Alternatively, however, the transmission can be designed so that it has a driven shaft part which can be connected to the universal joint propeller shaft and can be offset axially parallel to the driven shaft of the electric motor. The transmission, which can be designed as a spur gear transmission, for example, can be appropriately designed so that it can be small enough for the axis of rotation of the driven shaft part to run radially inside the preferably cylindrical external contour of the electric motor. By rotating the electric motor-transmission component, the distance from the ground of the transmission-side joint of the universal joint propeller shaft and/or the ground clearance of the component can be varied. Such clearance can be varied without requiring structural modifications of the component, except for the points at which the component can be fastened to the auxiliary frame.

In an additional appropriate configuration, the auxiliary frame, which can connect the electric motor-transmission components to one another, can also make it possible to fasten the components so that the axes of rotation of the driven shaft parts of the transmissions can be inclined in relation to one another. This measure can also facilitate the adaptation of the drive assembly to specific requirements which can result from the special design of the vehicle, since when the axes of rotation are inclined, it is frequently essentially possible to reduce the angle of the articulation of the universal joint propeller shafts.

In one preferred embodiment of the present invention, the electric motor-transmission component can comprise a support part, which support part can be common to the electric motor and the transmission. The support part can include a rotor of the electric motor, which rotor can be connected non-rotationally to a driven shaft. A stator of the electric motor can be fastened in a stationary manner, and a driven shaft part of the transmission can be rotationally mounted. The auxiliary frame can connect the components by means of their support parts, and in particular, exclusively by means of their support parts, which can significantly simplify the design and assembly of the components, in particular if the rotor of the electric motor is cantilevered on the support part. The support part can simultaneously, advantageously form the transmission housing, since it can be highly desirable that the support part can also absorb the support forces of the driven shaft part of the transmission.

But a significant simplification of the design can be achieved if the housing of the electric motor is attached separately to the support piece. In accordance with a preferred embodiment of the present invention, in particular, the motor housing can be made of a material which is different from that of the support piece. In particular, if the electric motor has an external rotor enclosing the stator, the motor housing can appropriately comprise insulating material. In the motor housing, therefore, no induction currents can preferably be induced which can result in a heating of the housing. The motor housing can be a housing tube which encloses both electric motors of the two electric motor-transmission components jointly. But the housings can also be separated from one another and can have a pot shape, for example. It goes without saying that the motor housing comprising insulating material does not need to extend over the entire axial length of the rotor, but can also overlap axially with only a portion of the rotor.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a kit for providing a drive train of a motor vehicle, the kit for permitting adjustment of the drive train to fit within the varying track distances of a plurality of motor vehicles, the motor vehicle having: a chassis defining a longitudinal direction and an axial direction perpendicular to the longitudinal direction; a suspension system; a plurality of drive wheels; the suspension system providing a suspension connection between the drive wheels and the chassis in a vertical direction with respect to the chassis; the plurality of drive wheels comprising at least one pair of drive wheels comprising a left drive wheel and a right drive wheel with respect to the longitudinal axis of the chassis; the left and right drive wheels being disposed spaced apart from one another by a predetermined track distance; and the kit for providing a drive train comprising: at least one set of drive train assemblies; the set of drive train assemblies comprising a left drive train assembly and a right drive train assembly; the left drive train assembly being disposed substantially adjacent the left drive wheel; the right drive train assembly being disposed substantially adjacent the right drive wheel; motor for driving the left and right drive wheels to propel the motor vehicle; the motor for being disposed substantially between the left and right drive wheels; a connecting apparatus for connecting the motor to the chassis; the left drive train assembly comprising a propeller shaft; the right drive train assembly comprising a propeller shaft; each propeller shaft having a predetermined and standard length and a first end and a second end; the first end of each left and right propeller shaft being disposed substantially adjacent the motor; a device for mounting the second end of the left propeller shaft to the left drive wheel; a device for mounting the second end of right propeller shaft to the right drive wheel; the motor comprising a transmission for transmitting power from the motor to the left and right propeller shafts and the left and right drive wheels; the transmission comprising a left portion and a right portion; the left portion of the transmission facing toward the first end of the left propeller shaft; the right portion of the transmission facing toward the first end of the right propeller shaft; the left portion of the transmission comprising a left output shaft; the right portion of the transmission comprising a right output shaft; each output shaft having a first end and a second end; the first end of the left output shaft extending axially away from the left portion of the transmission; the first end of the right output shaft extending axially away from the right portion of the transmission; an apparatus for connecting the first end of the left propeller shaft with the first end of the left output shaft; an apparatus for connecting the first end of the right propeller shaft with the first end of the right output shaft; an apparatus for variably positioning the first end of the left output shaft with respect to the first end of the left propeller shaft and for variably positioning said first end of the right output shaft with respect to the first end of the right propeller shaft; and the apparatus for variably positioning comprising an apparatus for permitting adjustment of the drive train to fit within the varying track distance of a plurality of motor vehicles having a plurality of different track distances within a range of track distances and for permitting adjustment of the drive train to fit within and provide the predetermined track distance between the left and right drive wheels within a range of track distances.

Another aspect of the present invention resides broadly in a method of making a motor vehicle using a kit, which kit is for providing the drive train of the motor vehicle the method comprising the steps of: providing the chassis; providing the suspension system; providing at least one pair of drive wheels comprising a left drive wheel and a right drive wheel; providing the suspension system with a suspension connection between the drive wheels and the chassis in a vertical direction with respect to the chassis; providing the left drive train assembly and the right drive train assembly; providing the motor for driving the left and right drive wheels to propel the motor vehicle; providing a left propeller shaft and a right propeller shaft; providing each propeller shaft with a predetermined and standard length, each propeller shaft having a first end and a second end; providing a device for mounting the second end of said left propeller shaft to the left drive wheel; providing a device for mounting the second end of the right propeller shaft to the right drive wheel; providing a transmission for transmitting power from the motor to the left and right propeller shafts and the left and right drive wheels; providing the left output shaft; providing the right output shaft; providing an apparatus for connecting the first end of the left propeller shaft with the first end of the left output shaft; providing an apparatus for connecting the first end of the right propeller shaft with the first end of the right output shaft; providing an apparatus for variably positioning the first end of the left output shaft with respect to the first end of the left propeller shaft and for variably positioning the first end of the right output shaft with respect to the first end of the right propeller shaft; the method further comprising: mounting the motor on the chassis by the apparatus for connecting the motor to the chassis; mounting the suspension system on the chassis; disposing the left drive train assembly substantially adjacent the left drive wheel; disposing the right drive train assembly substantially adjacent the right drive wheel; disposing the left propeller shaft on the left drive train assembly; disposing the right propeller shaft on the right drive train assembly; disposing the first end of each left and right propeller shaft substantially adjacent the motor; disposing the drive wheels spaced apart from one another by the predetermined track distance; mounting, by the device for mounting, the second end of the left propeller shaft to the left drive wheel; mounting, by the device for mounting, the second end of the right propeller shaft to the right drive wheel; connecting the drive wheels with the suspension system; disposing transmission in the motor, the transmission comprising a left portion and a right portion; disposing the left portion of the transmission to face toward the first end of the left propeller shaft; disposing the right portion of the transmission to face toward the first end of the right propeller shaft; disposing the left output shaft on the left portion of the transmission; disposing the right output shaft on the right portion of the transmission; disposing the first end of the output shaft to extend axially away from the left portion of the transmission; disposing the first end of the right output shaft to extend axially away from the right portion of the transmission; positioning, by the apparatus for variably positioning, the first end of the left output shaft with respect to the first end of the left propeller shaft; positioning, by the apparatus for variably positioning, the first end of the right output shaft with respect to the first end of the right propeller shaft; connecting, by the apparatus for connecting, the first end of the left propeller shaft with the first end of the left output shaft; connecting, by the device for connecting, the first end of the right propeller shaft with the first end of the right output shaft; variably positioning the drive train, by the apparatus for variably positioning, within the track distance of a motor vehicle, which motor vehicle has a track distance within a range of track distances of a plurality of motor vehicles having a plurality of different track distances; variably positioning the drive train, by the apparatus for variably positioning, within the track distance of a motor vehicle to fit within and provide the predetermined track distance between the left and right drive wheels within the range of track distances; adjusting the drive train, by said means for permitting adjustment of the drive train, to fit within the varying track distance of a plurality of motor vehicles having a plurality of different track distances within a range of track distances; and adjusting the drive train, by the apparatus for permitting adjustment of the drive train, to fit within and provide the predetermined track distance between the left and right drive wheels within the range of track distances.

BRIEF DESCRIPTION OF THE DRAWINGS

Embodiments of the invention are described in greater detail below with reference to the accompanying drawings, in which.

DESCRIPTION OF THE PREFERRED EMBODIMENT

Figure 1:
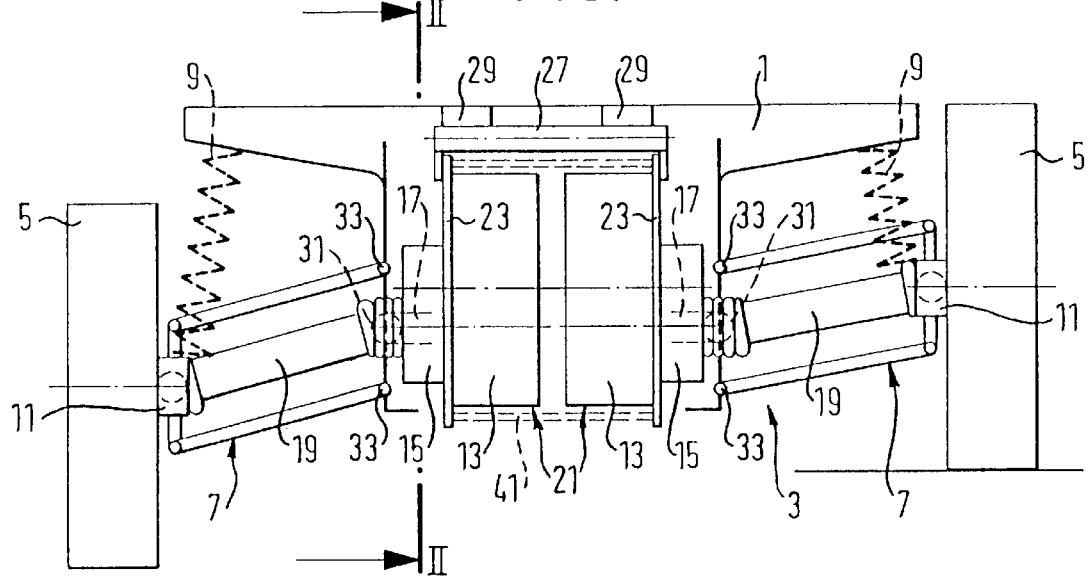
FIG. 1 is a schematic view of a drive axle of a motor vehicle, viewed in the direction of travel, with one embodiment of an electrical drive assembly according to the present invention.

FIG. 1 shows a bolster 1, and a drive axle which is designated in general by the number 3, of a motor vehicle with two drive wheels 5, viewed in the direction of travel, located on both sides of the vehicle longitudinal center plane. The drive wheels 5 can be guided by wheel guides 7, here shown as parallel control arm structures which can move essentially in the vertical direction of the vehicle on the bolster 1. The bolster 1 can sit flexibly on wheel mountings 11 in wheel suspensions 9. The left drive wheel 5 illustrated in FIG. 1 is shown in the rebound state, whereas, the right drive wheel 5 is shown in the deflected state. Not shown is the vehicle body which is supported on the bolster 1 by means of vibration dampers, e.g. made of rubber, which are also not shown in any further detail. It is apparent that the wheel suspensions 9 and/or the wheel guides 7 can also be connected by hinges or supported in another manner, e.g. directly on the vehicle body.

Each of the two drive wheels 5 of the drive axle system 3 can be driven by a separate electric motor 13 by means of a transmission 15, the output shaft part 17 of which can be non-rotationally connected to the corresponding drive wheel 5 regardless of its instantaneous vertical position. The transmission 15 can preferably be located on the respective side of the electric motor 13 axially facing the corresponding drive wheel 5 and can be connected with it to form a component which is designated 21. The component 21 can comprise a support part 23 which can be common to the transmission 15 and to the electric motor 13, on which the driven shaft part 17 and the driven shaft 25 of the electric motor 13 can be rotationally mounted by means of pivot bearings which are not illustrated in any further detail. The two components 21 can thus be located separately from one another axially in the space between the drive wheels 5. The components 21, for their part, can be connected into a unit by means of an auxiliary frame which, in this case, can be formed of several struts 27. The struts 27 can be attached by means of flanges to the support parts 23 and can be held by means of elastic rubber mounts 29 on the bolster 1. It is apparent that the auxiliary frame can also be designed in another manner. It is essential only that the auxiliary frame define the spatial position of the two components 21 relative to one another and to the bolster 1. In particular, the auxiliary frame can also be an integral component of the bolster 1. The auxiliary frame can be designed so that the transmission-side joints of the universal joint propeller shafts 19 indicated by 31 are essentially located at the location of or in the vicinity of the instantaneous center of rotation of the drive wheels 5, in the example of the parallel control rod guide illustrated in FIG. 1, therefore, in the plane of the transmission-side control rod joints indicated by 33. The auxiliary frame connecting the components 21 to one another and to the bolster 1 therefore can make it possible to locate the component 21 so that the vertical movement of the drive wheels essentially does not cause any longitudinal offset of the transmission-side joints 31, so that comparatively short universal joint propeller shafts 19 can also be used.

Figure 2:
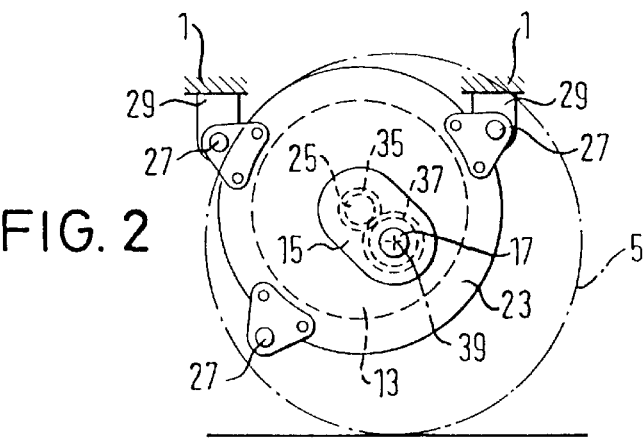
FIG. 2 is a schematic side view of the drive assembly, viewed along a Line II—II in FIG. 1.

As shown in FIG. 2, the driven shaft part 17 of the transmission 15 can preferably be offset axially parallel to the driven shaft 25 of the electric motor 13. The electric motor 13 can have an approximately cylindrical shape, whereby the driven shaft part 17 of the transmission 15 can be offset axially parallel to the driven shaft 25 of the electric motor 13. The electric motor 13 can have an approximately cylindrical shape, whereby the driven shaft part 17 can preferably lie radially inside the circumferential contour of the electric motor 13. By means of a suitable selection of the relative angular position of the electric motor 13, the position of the driven shaft part 17, in terms of its height and the position in the direction of travel, can be varied by a suitable selection of fastening points of the auxiliary frame on the support part 23, and adapted to the special requirements of the situation. The transmission 15 can, for example, be a reducing spur gear transmission with a pinion 35 which sits on the driven shaft 25 of the electric motor 13, and a gear wheel 37 formed by the driven shaft part 17.

Figure 3:
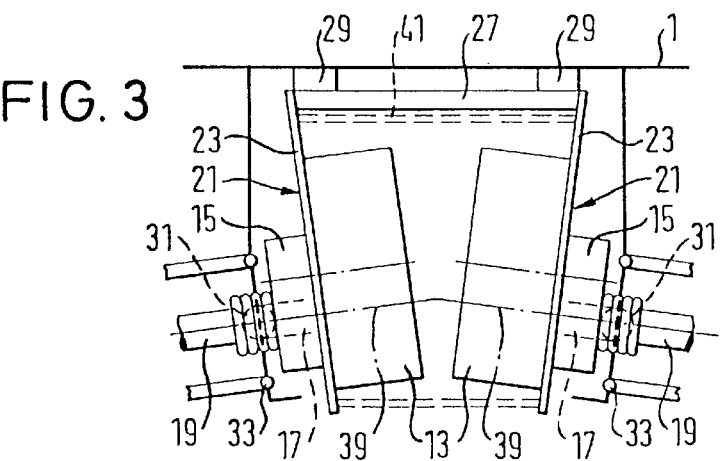
FIG. 3 illustrates a variant of the drive assembly illustrated in FIG. 1.

The bending angle at which the universal joint propeller shaft 19 is bent relative to the axis of rotation of the driven shaft part 17, is limited. To keep the bending angle as small as possible in relation to the extended position of the transmission-side joint 31, the auxiliary frame formed by the struts 27, as shown in FIG. 3, can also be realized so that the axes of rotation of the driven shaft parts 17, as indicated by 39 in FIG. 3, run at an angle to one another. Otherwise, the design is the same as the design explained with reference to the accompanying FIGS. 1 and 2.

In the embodiments explained above, the support part 23 simultaneously forms the transmission housing of the transmission 15. But it is apparent that the transmission housing can also be designed so that it is separate from the support part 23. The same is true for a housing of the electric motor 13, which is preferably realized separately from the support part 23. But as indicated by 41, the two electric motors 13 can also be realized without their own housings, to reduce costs and weight. Instead, between the support parts 23, there can be a housing tube 41 which is common to both electric motors 13, which encloses both the electric motors 13. Although the electric motors can be designed in the conventional manner, they preferably have an external rotor which radially externally encloses the stator which is firmly connected to the support part 23 and has a number of permanent magnets distributed in the circumferential direction with alternating polarity. To prevent the induction of eddy currents and thus a heating of the housing, e.g. of the housing tube 41, the housing or housing tube is preferably made of insulating material.

Figure 4:
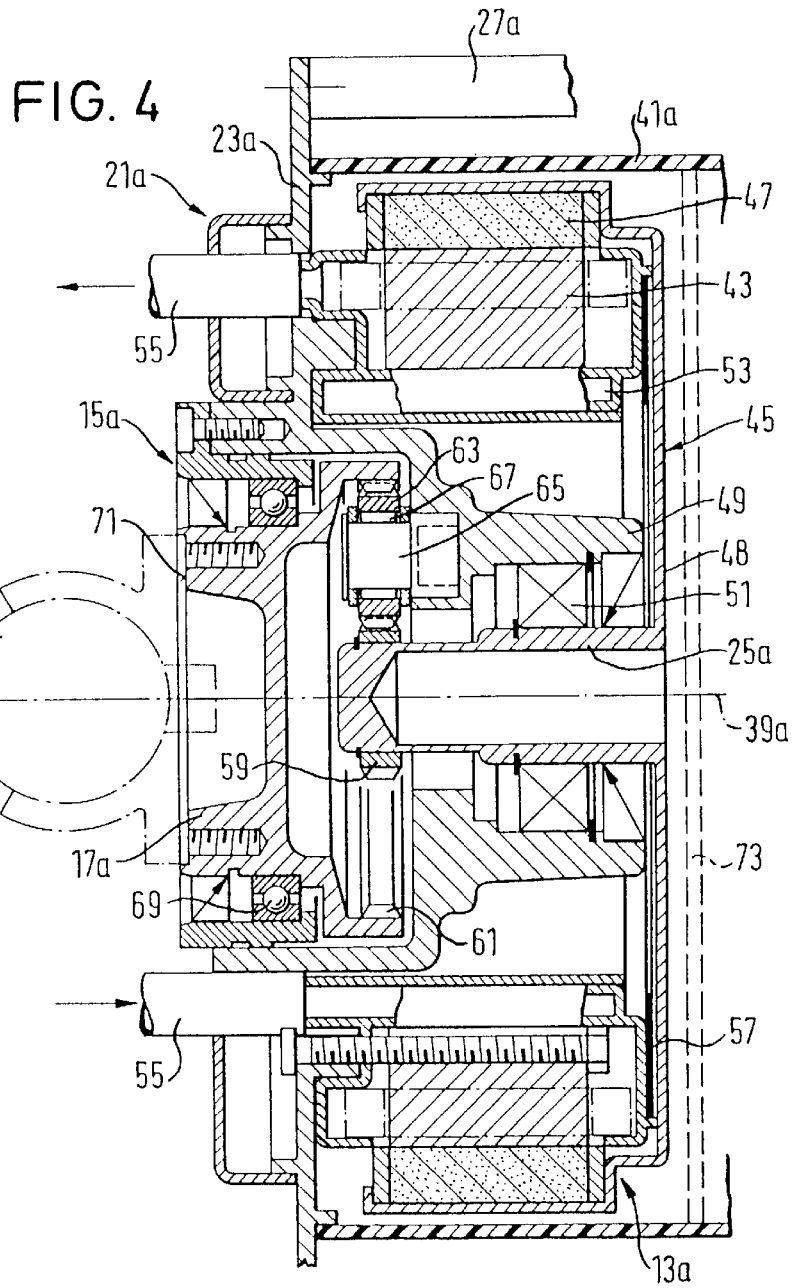
FIG. 4 is an axial longitudinal section through an electric motor-transmission unit for a drive assembly according to the present invention.

FIG. 4 shows one embodiment for a variant of an electric motor-transmission component 21a which, instead of a spur gear transmission with a driven shaft part located eccentrically in relation to the drive shaft of the electric motor, shows a variant with equiaxial axes of rotation. In the following description, parts which have the same or equivalent functions are indicated with the same reference numbers as in FIGS. 1 to 3, and are provided with a letter to distinguish them. Reference should be made to the description of FIGS. 1 to 3 for an explanation of the general structure and method of operation. FIG. 4 shows only one of the electric motor-transmission components 21a. The bolster and the other components of the wheel guides etc. corresponding to it are not shown, although they are present.

The electric motor 13a is designed as an external rotor motor, the sheet metal stator 43 of which forms a very large number of poles distributed in the circumferential direction. Corresponding to the poles there are field windings which are excited during rotation by electronic commutator circuits not shown in any additional detail. The stator 43 is fastened to the support part 23a. The stator 43 is surrounded radially outwardly by an essentially pot-shaped rotor 45, which on its outside circumference supports a number of permanent magnets which are arranged next to one another with alternating polarity in the circumferential direction. The rotor 45, on the side of the stator 43 axially farther from the support part 23a, has a disc-shaped end wall 47, from which the driven shaft 25a extends into a bearing extension 49 of the bearing part 23a surrounded by the stator 43. A roller bearing 51 supports the rotor 45 in cantilever fashion on the bearing extension 49. As shown in FIG. 4, the driven shaft 25a can be molded in one piece onto the end wall 47, e.g. made of sheet metal, but it can also be attached in another manner.

The electric motor 13a, which is suitable for rather high outputs, can have, radially inside the stator 43, a ring-shaped coolant channel 53, which is connected by means of lines 55 to a coolant circuit. 57 designates elements of an angular position transmitter which is connected to the electronic commutation circuit indicated above.

The support part 23a simultaneously forms a housing for a planetary transmission 15a which extends into the inner cavity of the stator 43 and thus saves space. The sun wheel 59 of the planetary transmission 15a sits non-rotationally on the drive shaft 25a and is enclosed equiaxially with the axis of rotation 39a of the driven shaft part 17a by a ring gear 61 molded or attached to the driven shaft part 17a. The support part 23a forms a planet carrier 63, on which several, e.g. three or five planet wheels 63 are rotationally mounted over bearing necks 65 by means of needle bearings 67. The planet wheels 63 are engaged with the sun wheel 59 and the ring gear 61, reducing the output speed of the driven shaft part 17a, in relation to the speed of the rotor 45. The driven shaft part 17a is mounted by means of its roller bearing 69 on the support part 23a on the side of the plane of circulation of the planet wheels 63 farther from the rotor 45. The driven shaft part 17a, in the vicinity of the roller bearing 69, forms a flange surface 71 to which the transmission-side joint 31a of the universal joint propeller shaft 19a is fastened, e.g. by means of screws, to the driven shaft part 17a directly, i.e. without the intermediate piece which significantly changes the distance from the driven shaft part 17a. In this manner, the joint 31a can be installed very close to the roller bearing 69. There is preferably only a single-row roller bearing.

In FIG. 4, the housing tube 41a made of insulating material, e.g. plastic, is visible, and can hold the permanent magnets 47 of the rotor 45 close together, as a result of which the permanent magnets cannot induce any eddy currents in the housing tube 41a. The housing tube 41a can, as explained above, extend beyond both components 21a. But it can also be extended by means of a rear wall 73 into a plastic housing which corresponds exclusively to one of the electric motors 13a.

Figure 5:
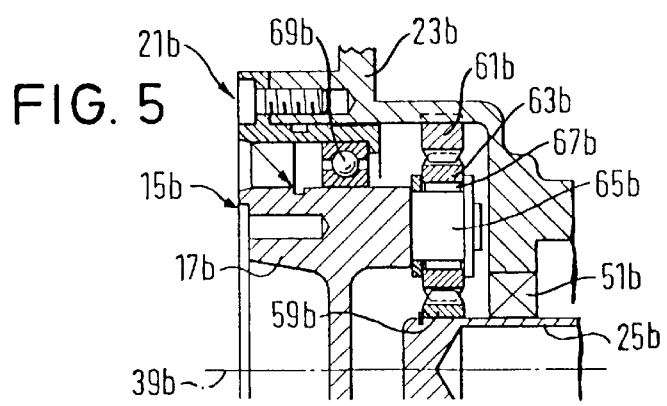
FIG. 5 is a detail of one variant of the component illustrated in FIG. 4.

FIG. 5 shows a variant of a component 21b which differs from the component illustrated in FIG. 4 essentially only in terms of the design of its planetary transmission 15b. In this case, the driven shaft part 17b does not support the ring gear, but forms a planet carrier, on whose bearing necks 65b, which are axially parallel to the axis of rotation 39b, the planet wheels 63b are rotationally mounted by means of needle bearings 67b. The planet wheels 63b are engaged on one hand with the sun wheel 59b which, in turn, sits on the driven shaft 25b of the electric motor, and on the other hand with the ring gear 61b which can be mounted non-rotationally on the support part 23b. The ring gear 61b can be molded in one piece to the support part 23b, but it can also be installed at a later time. The electric motor is otherwise the same as the embodiment illustrated in FIG. 4. In particular, the rotor is once again mounted in cantilever fashion by means of the bearing 51b on the support part 23b.

The present invention may be employed, for example, in the assembly of buses. Buses, for example, must frequently be designed to accommodate specific road widths, some road widths being extremely narrow relative to other road widths. The present invention, employed in a street bus or an airport bus, for instance, can make possible the specific track distance and dimensions required for assembly of buses for either narrow or wide roads.

The disclosure now turns to a discussion of a hybrid drive arrangement, and vehicles using the same, having components that may be utilized in accordance with the embodiments of the present invention. It should be understood that components discussed herebelow with relation to FIGS. 6–10 may, if appropriate, be considered to be interchangeable with similar components discussed hereabove with relation to FIGS. 1–5.

Figure 6:
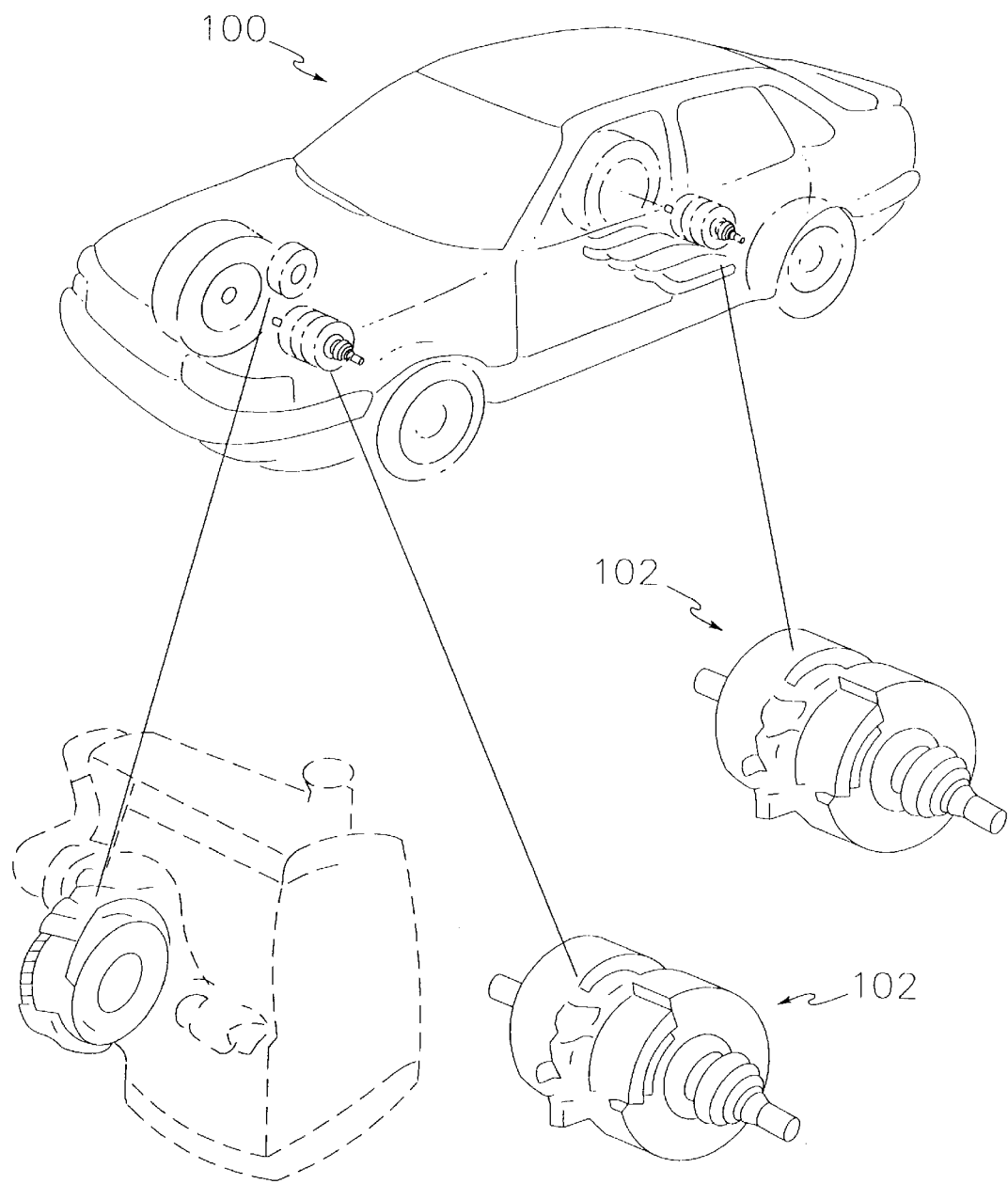
FIG. 6 illustrates a typical automobile which may employ a hybrid drive, such as an internal combustion engine-electric generator unit, in accordance with at least one preferred embodiment of the present invention.

FIG. 6 illustrates a typical automobile in which the present invention may be employed. As shown, an automobile 100 may include two electric motor arrangements, 102, wherein each such motor arrangement can conceivably include two motors for driving a corresponding wheel. It will be appreciated from the disclosure herebelow that such motor arrangements can be driven by a combination, or hybrid, internal combustion engine-electric generator.

Figure 7A:
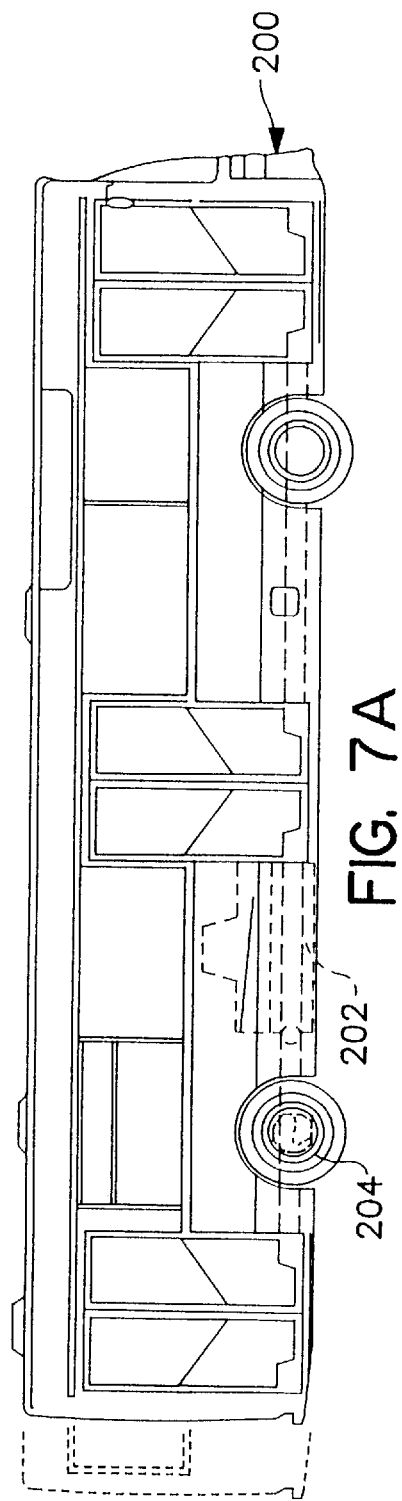
FIGS. 7A and 7B illustrate elevational and plan views, respectively, of a bus, such as an urban public transportation bus, which may employ one or more hybrid drives in accordance with at least one preferred embodiment of the present invention.
Figure 7B:
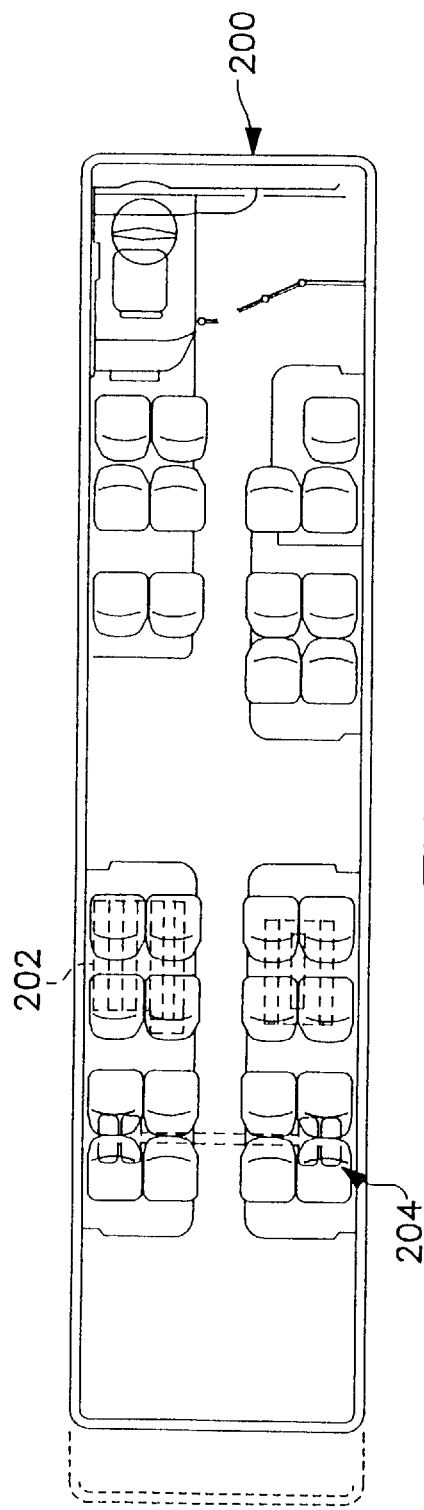

FIGS. 7A and 7B illustrate, respectively, a conventional urban transportation bus 200 in elevational and plan view, in which the present invention may be employed. Particularly, the bus 200 may include an internal combustion engine-electric generator unit 202 for powering individual motors associated with corresponding wheels or sets of wheels. In the bus 200 shown in FIGS. 7A and 7B, the internal combustion engine-electric generator unit 202 is shown as being positioned immediately forward of a rearmost set of wheels 204.

Figure 8A:
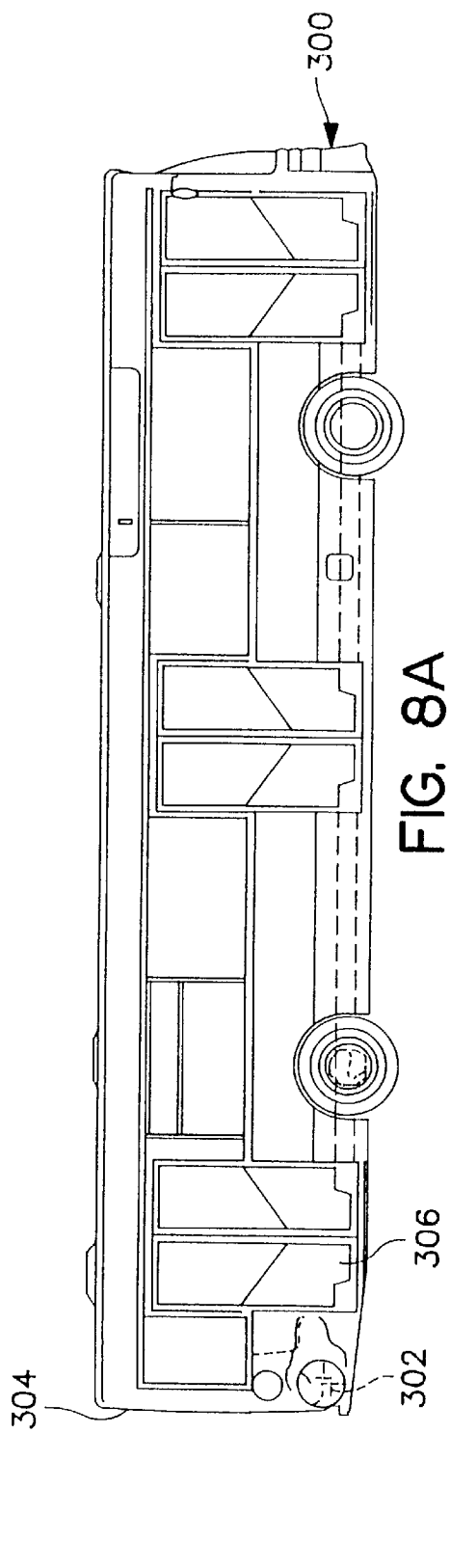
FIGS. 8A and 8B illustrate elevational and plan views, respectively, of another bus, such as an urban public transportation bus, which may employ one or more hybrid drives in accordance with at least one preferred embodiment of the present invention.
Figure 8B:
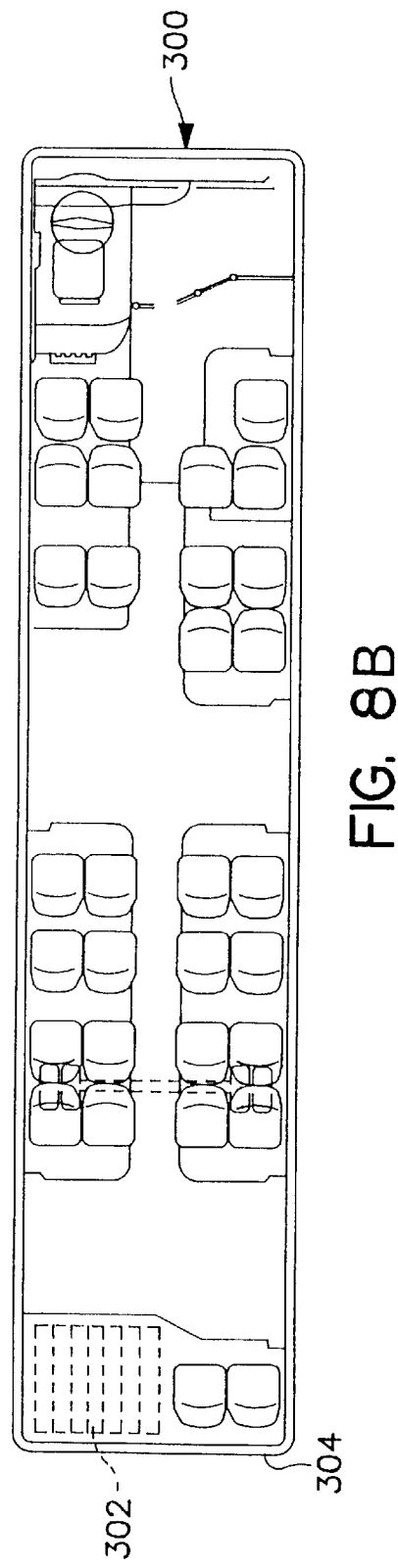

FIGS. 8A and 8B illustrate, respectively, another conventional urban transportation bus 300 in elevational and plan view, in which the present invention may be employed. Particularly, the bus 300 may include an internal combustion engine-electric generator unit 302 for powering individual motors associated with corresponding wheels or sets of wheels. In the bus 300 shown in 8A and 8B, the internal combustion engine-electric generator unit 302 is shown as being positioned virtually directly adjacent the rear panel portion 304 of the bus 300, and behind a rearmost set of doors 306.

Further details of the functioning of an internal combustion engine-electric generator unit, in conjunction with individual drive motors for individual wheels, can be found in German Patent Application No. 41 33 013 A1 and in VDI-Berichte 878 (199), pages 611–622, both of which are incorporated herein by reference. Particularly, these documents discuss arrangements for controlling individual electric motors associated with corresponding wheels. Similar components and arrangements may also be found in the U.S. Patents listed towards the close of the instant specification.

It should be appreciated that the components discussed hereinabove with relation to FIGS. 6–8B may, if appropriate, be considered to be interchangeable with similar components discussed hereinabove with relation to FIGS. 1–5.

One feature of the invention resides broadly in the electrical drive assembly for a pair of drive wheels 5 which are both part of the drive axle system of a vehicle, in particular of a car or truck, and are guided by wheel guides 7 which can move at least approximately in the vertical direction of the vehicle, comprising two electric motors 13 located axially next to one another between the drive wheels 5, each of the electric motors 13 being connected into one unit with a transmission 15 facing the drive wheel 5 next to it and in a drive connection with the adjacent drive wheel 5 by means of the transmission 15, and each universal joint propeller shaft 19 connected to an output shaft part 17 of the transmission, characterized by the fact that each of the two electric motor-transmission units forms a mechanically operational component 21 separate from the other unit, and that the two components 21 are connected to one another and to the vehicle by means of an auxiliary frame 27 which defines the axial distance between the two components 21.

Another feature of the invention resides broadly in the drive assembly characterized by the fact that the driven shaft part 17 of the transmission 15 is rotationally mounted by means of at least one pivot bearing 69, in particular a roller bearing, to a support part 23 which forms in particular a transmission housing, and the universal joint propeller shaft 19 is held with its transmission-side joint 31 directly on the driven shaft portion 17.

Yet another feature of the invention resides broadly in the drive assembly characterized by the fact that the transmission is designed as a planetary transmission 21a, b with three transmission components which can rotate relative to one another around a common axis of rotation 39a, b, a first transmission component of which forms a sun wheel 59; 59b which is central in relation to the axis of rotation, a second transmission component which forms a ring gear 61, 61b surrounding the sun wheel coaxially, and a third transmission component which comprises a planet carrier 23a, 65a; 17b, 65b and several planet wheels 63, 63b rotationally mounted axially parallel to the axis of rotation 39a, b, distributed around the circumference and engaged with the sun wheel 59; 59b and with the ring gear 61; 61b, whereby one of the three transmission components is non-rotationally connected to a driven shaft 25a, b of the electric motor 13a, another of the three transmission components forms a driven shaft part 17a, b of the transmission to be connected to the universal joint propeller shaft 19a and another of the three transmission components is non-rotationally connected to the support part 23a, b, and that the driven shaft part 17a, b is mounted on the support part 23a, b by means of a single-row ball bearing, on the side of the plane of rotation of the planet wheels 63; 63b axially farther from the electric motor 13a.

Still another feature of the invention resides broadly in the drive assembly characterized by the fact that the sun wheel 59; 59b is non-rotationally connected to the driven shaft 25a, b of the electric motor 13a and the driven shaft part 17a, b forms the planet carrier 23a, 65; 17b, 65b or the ring gear 61, 61b.

A further drive assembly characterized by the fact that the transmission 15 has a driven shaft part 17 which is offset axially parallel from a driven shaft 25 of the electric motor 13 and is connected to the universal joint propeller shaft 19.

Another feature of the invention resides broadly in the drive assembly characterized by the fact that the transmission 15 is designed as a spur gear transmission.

Yet another feature of the invention resides broadly in the drive assembly characterized by the fact that the electric motor 13 has an essentially cylindrical external contour and that the axis of rotation 39 of the driven shaft part 17 runs radially inside the external contour of the electric motor 13.

Still another feature of the invention resides broadly in the drive assembly characterized by the fact that the auxiliary frame 27 fastens the electric motor-transmission components 21 to one another with the axes of rotation 39 of their driven shaft parts 17 of their transmissions 15 inclined in relation to one another.

A further feature of the invention resides broadly in the drive assembly characterized by the fact that the electric motor-transmission component 21a comprises a support part 23a common to the electric motor 13a and to the transmission 15a, on which both a rotor 45 of the electric motor 13a non-rotationally connected to a driven shaft 25a is mounted rotationally, and a stator 43 of the electric motor 13a is fastened in a stationary manner, and on which a driven shaft part 17a of the transmission 15a is mounted rotationally, and that the auxiliary frame 27a connects the components 21a to one another by means of their support parts 23a, in particular exclusively by means of their support parts.

Another feature of the invention resides broadly in the drive assembly characterized by the fact that the electric motor 13a comprises a permanent magnet rotor 45 which has a number of permanent magnets 47 on its outside circumference, which is rotationally mounted with its driven shaft 25 radially inside the circumferential area limited by the permanent magnets 47 on a bearing extension 49 of the support part 23a.

Yet another feature of the invention resides broadly in the drive assembly characterized by the fact that the permanent magnet rotor 45 is a permanent magnet external rotor 45 which encloses the stator radially outwardly, and that the support part 23a is made of metal and does not overlap in the axial direction, or over only a portion of its length, the area of the outside circumference of the external rotor 45 which has the permanent magnets.

Still another feature of the invention resides broadly in the drive assembly characterized by the fact that the support part 23a is designed as a transmission housing and that each electric motor 13a is surrounded, at least over its outside circumference between the support parts 23a of the two components 21a by a housing 41a which is made of insulating material.

A further feature of the invention resides broadly in the drive assembly characterized by the fact that a housing tube 41a made of insulating material and which encloses the two components 21a jointly is located between the support parts 23a.

In recapitulation, the present invention generally relates to an electrical drive assembly for a pair of drive wheels which are common to a drive axle system of a motor vehicle, in particular of a car or truck. The drive wheels can be moved on the vehicle by wheel guides at least approximately in the vertical direction of the vehicle.

VIE-Berichte [VDI-Reports] No. 878, 1991, Pages 611 to 622, discloses that drive wheels of a motor vehicle which are guided flexibly by means of their wheel guides on the vehicle body can have separate electric motors, which separate electric motors are rotationally connected to the corresponding drive wheels by means of universal-joint propeller shafts. The electric motors, which are motors with permanent magnet external rotors, are powered by means of an electronic commutator circuit from a generator which, for its part, is driven by an internal combustion engine. The drive torque and the speed of the electric motors are controlled electrically, so that there is no need for mechanical transmissions etc., such as those which are located between the internal combustion engine and the drive wheels in conventional motor vehicles.

In further recapitulation, the electric motors of such known drive assemblies are combined into one component which is elastically damped but is mounted on the vehicle body, essentially stationary relative to it. On the other hand, the three-dimensional position of the instantaneous axis of rotation of each drive wheel changes during its suspension movement. As a rule, the electric motor with the universal joint propeller shaft connecting the drive wheel must not only be able to execute a bending movement, but it must also allow for the differences in length which result during the bending movement. In conventional electric motor drive assemblies, an attempt is therefore made to place the motor-side joint of the universal joint propeller shaft as far as possible toward the center of the vehicle, since the bending angle and the longitudinal offset of the universal joint propeller shaft are smaller, the longer the universal joint propeller shaft can be made. EP-A-249 807 discloses that each of the two electric motors can be connected by means of a spur gear into one component, in which the transmission projects radially beyond the electric motor in its axis of rotation, and is located on the side of the electric motor farther from the corresponding drive wheel. In this manner, a niche is created, radially outboard of the electric motor and facing the drive wheel, in which niche the motor-side joint of the extended universal joint propeller shaft can be installed. The two electric motor-spur gear transmission components can be combined by means of their transmission housings into a single unit, which is fastened as a unit to the vehicle. But the two components can also be installed individually and can be separated by some distance.

DE-A-37 25 620 also discloses such a motor vehicle with electric motors corresponding to the individual drive wheels, whereby the electric motors can be combined into one component and can be located axially between the drive wheels. Each electric motor can face the drive wheel to be driven and a planetary transmission can be attached to the electric motor. The sun wheel of the planetary transmission can sit on the driven shaft of the electric motor. The planet carrier of the planetary transmission can support the planet wheels and can be connected to the drive wheel by means of a universal joint propeller shaft. A ring gear which, like the sun wheel, is engaged with the planet wheels can be fixed by means of a multiple disc brake relative to the electric motor. When the brake is released, the ring gear makes it possible to uncouple the electric motor from the drive wheel. To save axial space, and therefore to make the universal joint propeller shafts as long as possible, the rotors of the electric motors are housed in a common intermediate wall or partition.

The objective of making the universal joint propeller shafts as long as possible, which is common to conventional drive assemblies, makes it necessary to locate the motor-side joints of the universal joint propeller shafts as close as possible to the longitudinal center plane of the vehicle, and makes it necessary to vary the housing designs for the electric motors and the transmission to suit the requirements of the specific vehicle, e.g. to respond to different requirements for clearance above the road surface and the kinematics of the wheel guides.

In final recapitulation, the object of the present invention is to improve an electric drive assembly of the type explained above, so that only a low investment of time, effort and money is required to vary the components designed for the adaptation to the vehicle.

The present invention, in accordance with at least one preferred embodiment departs from an electric drive assembly of a type such as that described further above, whereby the drive assembly can comprise two electric motors located axially next to one another between the drive wheels. Each of the electric motors can face the drive wheel closest to it and the electric motors can be connected into one unit with a transmission. By means of the transmission and a universal joint propeller shaft connected to an output shaft part of each of the transmissions, each electric motor can be in a driving connection with the closest drive wheel. The present invention teaches that such a drive assembly can be improved if each of the two electric motor-transmission units also preferably forms a mechanically operating unit which is separate from the other unit, and if the two components are held to one another and to the vehicle by means of an auxiliary frame which defines the axial distance between the two components.

The components disclosed in the various publications, disclosed or incorporated by reference herein, may be used in the embodiments of the present invention, as well as, equivalents thereof.

Examples of flexplate components, which may be utilized in accordance with the embodiments of the present invention, may be found in the following U.S. Pat. Nos. 5,323,665, which issued to Rediker on Jun. 28, 1994; No. 5,184,524, which issued to Senia on Feb. 9, 1993; No. 5,121,821, which issued to Poorman et al. on Jun. 16, 1992; and No. 4,672,867, which issued to Rodriguez on Jun. 16, 1987.

Examples of hybrid drive arrangements, such as internal combustion engine-electric generator arrangements, and components associated therewith, such as control arrangements and individual motors for driving corresponding wheels, may be found in the following U.S. Pat. Nos. 5,327,987, which issued to Abdelmalek on Jul. 12, 1994; No. 5,318,142, which issued to Bates et al. on Jun. 7, 1994; No. 5,301,764, which issued to Gardner on Apr. 12, 1994; No. 5,249,637, which issued to Heidl et al. on Oct. 5, 1993; No. 5,176,213, which issued to Kawai et al. on Jan. 5, 1993; No. 5,327,992, which issued to Boll on Jul. 12, 1994; No. 5,291,960, which issued to Brandenburg et al. on Mar. 8, 1994; and No. 5,264,764, which issued to Kuang on Nov. 23, 1993.

Examples of electric and hybrid vehicles, and related components, may be or are disclosed in the following U.S. Pat. Nos. 5,251,721 entitled "Semi-hybrid Electric Automobile" to Ortenheim; No. 5,004,061 entitled "Electrically Powered Motor Vehicle" to Andruet; No. 5,289,100 entitled "System for Powering, Speed Control, Steering, and Braking" to Joseph; No. 5,265,486 entitled "Portable External Drive Assembly" to AAMCO Corporation; No. 5,289,890 entitled "Drive Unit for Electric Motor Vehicle" to Aisin; and No. 5,310,387 entitled "Differential Motor Drive" to Hughes Aircraft Company.

Additional examples of electric vehicles in which the present invention may be utilized may be or are disclosed in the following U.S. Pat. Nos. 5,166,584 entitled "Electric Vehicle" to Nissan; No. 5,161,634 entitled "Electric Vehicle" to Kubota Corporation; and No. 5,150,045 entitled "Electric Automobile" to Kaisha.

Examples of planetary gear transmissions which may be utilized in accordance with the embodiments of the present invention, may be found in the following U.S. Pat. Nos. 5,120,282 entitled "Vehicle Transmission System" which issued on Jun. 9, 1992; No. 5,035,158 entitled "Electric Shift and Transfer Case Apparatus with Control System Therefor" issued on Jul. 30, 1991; No. 5,007,887 entitled "Planetary Gear Transmission for Motor Vehicle" issued on Apr. 16, 1991; No. 4,988,329 entitled "Final Drive Assembly" issued on Jan. 29, 1991; No. 4,963,124 entitled "Planetary Gear Transmission for Motor Vehicle" issued on Sep. 16, 1990; No. 5,019,755 entitled "Electric Motor Drive System" issued on May 28, 1991; and No. 5,014,800 entitled "Motor Driving Device Provided with Decelerator and Electric Vehicle" issued on May 14, 1991.

Examples of hydrostatic transmissions which may be utilized in accordance with the embodiments of the present invention, may be found in the following U.S. Pat. Nos. 5,071,391 entitled "Stepless Speed Changing Hydrostatic Transmission" to Shimadzu Corporation; No. 5,056,615 entitled "Vehicle Control System" to Johnston Engineering Limited; No. 5,046,994 entitled "Vehicle Transmission Assembly" to Kokyukoki; No. 5,048,295 entitled "Hydrostatic Transmission" to Hydromatik; No. 5,052,987 entitled "Stepless Hydrostatic-mechanical Transmission" to Nutzfahrzeuge; No. 4,951,462 entitled "Hydrostatic Transmission with Motor Start Control System" to Eaton; and No. 4,903,792 entitled "Hydraulic Motors and Vehicle Hydrostatic Transmission System of Wheel Motor Type" to Tan.

Examples of coolant pumps, which may be utilized in accordance with the embodiments of the present invention, may be found in the following U.S. Pat. Nos. 4,643,135, which issued to Wunsche on Feb. 17, 1987; No. 4,677,943, which issued to Skinner on Jul. 7, 1987; No. 4,827,589, which issued to Friedriches on May 9, 1989; No. 4,886,989, which issued to Britt on Dec. 12, 1989; and No. 4,728,840, which issued to Newhouse on Mar. 1, 1988.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 21 425.1, filed on Jun. 18, 1994, having inventor Dieter Lutz, and DE-OS P 44 21 425.1 and DE-PS P 44 21 425.1, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. In combination, a vehicle having a chassis, a plurality of wheels, and a plurality of electrical drive assemblies including at least a first electrical drive assembly and a second electrical drive assembly, each electric drive assembly comprising:

an auxiliary frame adapted to be connected to said chassis, said auxiliary frame including at least one transverse strut member extending transverse to a central longitudinal axis of said vehicle, and first and second mounting members fixedly connected to said at least one transverse strut member, said first and second mounting members having a predetermined lateral spacing therebetween;

a first electrical motor;

a first transmission;

said first electrical motor being connected to said first transmission to form a first electrical motor assembly;

a second electrical motor;

a second transmission;

said second electrical motor being connected to said second transmission to form a second electrical motor assembly;

said first electrical motor assembly fixedly mounted on a side of said first mounting member;

said second electrical motor assembly fixedly mounted on a side of said second mounting member;

a first rigid propeller shaft having an inner end connected to an output shaft of said first transmission and an outer end configured for mounting thereon a first one of said plurality of wheels;

a second rigid propeller shaft having an inner end connected to an output shaft of said second transmission and an outer end configured for mounting thereon a second one of said plurality of wheels, each of said first and second rigid propeller shafts having a predetermined length;

wherein the length of said first rigid propeller shaft of said first electrical drive assembly is substantially identical to the length of said first rigid propeller shaft of said second electrical drive assembly, and the length of said second rigid propeller shaft of said first electrical drive assembly is substantially identical to the length of said second rigid propeller shaft of said second electrical drive assembly, said first and second wheels being spaced apart by a first track distance when said first electrical drive assembly is connected to a chassis and said first and second wheels being spaced apart by a second track distance when said second electrical drive assembly is connected to a chassis, said first track distance being greater than said second track distance, said track distance being determined by the lateral spacing between the mounting members of said auxiliary frame, the lateral spacing between the mounting members of the first electrical drive assembly being greater than the lateral spacing between the mounting members of the second electrical drive assembly.

2. The combination of claim 1, wherein said first wheel and said second wheel comprise a first suspension system; the first suspension system has a first instantaneous center of rotation about which first instantaneous center of rotation the first wheel pivots as the first wheel moves in the substantially vertical direction of the first suspension system; the first suspension system has a second instantaneous center of rotation about which second instantaneous center of rotation the second wheel pivots as the second wheel moves in the substantially vertical direction of the first suspension system; wherein:

said first propeller shaft has an axis of rotation;

said first propeller shaft comprises a flexible coupling to permit the axis of rotation of said first propeller shaft to change angular position;

said output shaft of said first transmission is operatively connected to said flexible coupling of said first propeller shaft;

said first propeller shaft and said auxiliary frame are configured to dispose said flexible coupling of said first propeller shaft substantially at the first instantaneous center of rotation;

said second propeller shaft has an axis of rotation;

said second propeller shaft comprises a flexible coupling to permit the axis of rotation of said second propeller shaft to change angular position;

said output shaft of said second transmission is operatively connected to said flexible coupling of said second propeller shaft; and said second propeller shaft and said auxiliary frame are configured to dispose said flexible coupling of said second propeller shaft substantially at the second instantaneous center of rotation.

3. The combination of claim 2, wherein:

said first transmission comprises a support part to connect to said auxiliary frame, said support part to thereby mount said first motor on a chassis;

said support part comprises a transmission housing disposed to house said first transmission;

said support part comprises an arrangement to rotationally support said output shaft of said first transmission; and said flexible coupling of said first propeller shaft is supported directly on said output shaft of said first transmission.

4. The combination of claim 3, wherein:

said first transmission comprises a planetary gear transmission;

said planetary gear transmission comprises three transmission components;

said three transmission components are disposed to rotate relative to one another about a common axis of rotation;

said three transmission components comprise:
 a sun wheel;
 a ring gear; and
 a planet carrier and set of planet gears in combination;

said sun wheel is disposed centrally with respect to said ring gear and said planet carrier and set of planet gears;

said ring gear is disposed to coaxially surround said sun wheel;

said set of planet gears is disposed around a circumference of said sun wheel and is engaged with said sun wheel;

said set of planet gears is engaged with said ring gear;

one of said sun wheel, said ring gear, and said planet carrier is non-rotationally connected to a drive shaft of said first electrical motor;

another of said sun wheel, said ring gear, and said planet carrier is disposed on said output shaft of said first transmission; and yet another of said sun wheel, said ring gear, and said planet carrier is non-rotationally connected to said support part.

5. The combination of claim 4, wherein:

said support part comprises a single-row ball bearing disposed to rotationally connect said output shaft of said first transmission to said support part; and said single-row ball bearing is disposed on a side of a plane of rotation of said planet gears axially farther from said first electrical motor.

6. The combination of claim 5, wherein:

said sun wheel is non-rotationally connected to said first motor drive shaft;

said first electrical motor comprises a first rotor non-rotationally disposed on said first electrical motor drive shaft;

said second electrical motor comprises a second rotor non-rotationally disposed on a drive shaft of said second electrical motor;

said support part is a first support part;

said second electrical motor comprises a second support part corresponding to said second transmission;

said first support part and said second support part are connected to said auxiliary frame to connect said electrical motors to the chassis;

said first rotor is operatively rotationally connected to said first support part;

said second rotor is operatively rotationally connected to said second support part;

said first electrical motor comprises a first stator fixedly connected to said first support part;

said second electrical motor comprises a second stator fixedly connected to said second support part;

said auxiliary frame connecting to said support parts of said electrical motors is an exclusive arrangement for connecting said electrical motors to one another and said electrical motors are connected to one another exclusively by said support parts;

each of said rotors comprises a permanent magnet rotor;

each of said permanent magnet rotors has a radially inner portion and a radially outer portion;

each of said permanent magnet rotors comprises a plurality of permanent magnets disposed about said radially outer portion of a corresponding one of said rotors;

each of said support parts comprises a bearing extension disposed thereupon;

each of said permanent magnet rotors is rotationally mounted at said radially inner portion on a corresponding one of said bearing extensions of said support parts;

each of said permanent magnet rotors is a permanent magnet external rotor enclosing each of said stators radially outwardly;

each of said support parts comprise a metal material;

each of said support parts is disposed in one of the following relationships (A) and (B) with respect to said external rotor:
(A) in a nonoverlapping relationship with respect to a corresponding one of said external rotors; and
(B) in an overlapping relationship with respect to a corresponding one of said external rotors, such that said support part, over only a portion of its length, overlaps an area of the outside circumference of the external rotor which comprises said permanent magnets;

each of said electrical motors has an outer circumference;

each of said electrical motors are surrounded, at least over their outer circumferences, by a housing comprising insulating material;

said housing comprises a housing tube;

said housing tube comprises said insulating material; and said housing tube encloses said motors between said support parts.

7. The combination of claim 6, wherein:

each of said transmissions comprises a spur gear transmission;

said output shaft of said first transmission has an axis of rotation;

said output shaft of said second transmission has an axis of rotation; and said first electrical motor is disposed with respect to said second electrical motor so that the axis of rotation of said output shaft of said first transmission intersects the axis of rotation of said output shaft of said second transmission at a non-zero angle.

8. A method of assembling a vehicle having a chassis, a plurality of wheels, and a plurality of electrical drive assemblies including at least a first electrical drive assembly and a second electrical drive assembly, each electric drive assembly comprising:

an auxiliary frame adapted to be connected to said chassis, said auxiliary frame including at least one transverse strut member extending transverse to a central longitudinal axis of said vehicle, and first and second mounting members fixedly connected to said at least one transverse strut member, said first and second mounting members having a predetermined lateral spacing therebetween;

a first electrical motor;

a first transmission;

said first electrical motor being connected to said first transmission to form a first electrical motor assembly;

a second electrical motor;

a second transmission;

said second electrical motor being connected to said second transmission to form a second electrical motor assembly;

said first electrical motor assembly fixedly mounted on a side of said first mounting member;

said second electrical motor assembly fixedly mounted on a side of said second mounting member;

a first rigid propeller shaft having an inner end connected to an output shaft of said first transmission and an outer end configured for mounting thereon a first one of said plurality of wheels;

a second rigid propeller shaft having an inner end connected to an output shaft of said second transmission and an outer end configured for mounting thereon a second one of said plurality of wheels, each of said first and second rigid propeller shafts having a predetermined length;

wherein the length of said first rigid propeller shaft of said first electrical drive assembly is substantially identical to the length of said first rigid propeller shaft of said second electrical drive assembly, and the length of said second rigid propeller shaft of said first electrical drive assembly is substantially identical to the length of said second rigid propeller shaft of said second electrical drive assembly, said first and second wheels being spaced apart by a first track distance when said first electrical drive assembly is connected to a chassis and said first and second wheels being spaced apart by a second track distance when said second electrical drive assembly is connected to a chassis, said first track distance being greater than said second track distance, said track distance being determined by the lateral spacing between the mounting members of said auxiliary frame, the lateral spacing between the mounting members of the first electrical drive assembly being greater than the lateral spacing between the mounting members of the second electrical drive assembly; the method of assembling comprising the steps of:
(a) selecting a desired one of the electrical drive assemblies from the plurality of electrical drive assemblies to achieve the desired track distance;
(b) connecting the auxiliary frame of the selected electrical drive assembly to the chassis;
(c) connecting the first electrical motor to the first transmission to form the first electrical motor assembly;
(d) connecting the second electrical motor to the second transmission to form the second electrical motor assembly;
(e) fixedly mounting the first electrical motor assembly to the first mounting member;
(f) fixedly mounting the second electrical motor assembly to the second mounting member;
(h) connecting the first propeller shaft to the output shaft of the first transmission;
(i) connecting the second propeller shaft to the output shaft of the second transmission;
(j) mounting the first wheel to the first propeller shaft; and
(k) mounting the second wheel to the second propeller shaft.

9. The method of claim 8, wherein said first wheel and said second wheel comprise a first suspension system; the first suspension system has a first instantaneous center of rotation about which first instantaneous center of rotation the first wheel pivots as the first wheel moves in the substantially vertical direction of the first suspension system; the first suspension system has a second instantaneous center of rotation about which second instantaneous center of rotation the second wheel pivots as the second wheel moves in the substantially vertical direction of the first suspension system; wherein:

said first propeller shaft has an axis of rotation;

said first propeller shaft comprises a flexible coupling to permit the axis of rotation of said first propeller shaft to change angular position;

said output shaft of said first transmission is operatively connected to said flexible coupling of said first propeller shaft;

said first propeller shaft and said auxiliary frame are configured to dispose said flexible coupling of said first propeller shaft substantially at the first instantaneous center of rotation;

said second propeller shaft has an axis of rotation;

said second propeller shaft comprises a flexible coupling to permit the axis of rotation of said second propeller shaft to change angular position;

said output shaft of said second transmission is operatively connected to said flexible coupling of said second propeller shaft; and said second propeller shaft and said auxiliary frame are configured to dispose said flexible coupling of said second propeller shaft substantially at the second instantaneous center of rotation.

10. The method of claim 9, wherein:

said first transmission comprises a support part to connect to said auxiliary frame, said support part to thereby mount said first electrical motor on a chassis;

said support part comprises a transmission housing disposed to house said first transmission;

said support part comprises an arrangement to rotationally support said output shaft of said first transmission; and said flexible coupling of said first propeller shaft is supported directly on said output shaft of said first transmission.

11. The method of claim 10, wherein:

said first transmission comprises a planetary gear transmission;

said planetary gear transmission comprises three transmission components;

said three transmission components are disposed to rotate relative to one another about a common axis of rotation;

said three transmission components comprise:
 a sun wheel;
 a ring gear; and
 a planet carrier and set of planet gears in combination;

said sun wheel is disposed centrally with respect to said ring gear and said planet carrier and set of planet gears;

said ring gear is disposed to coaxially surround said sun wheel;

said set of planet gears is disposed around a circumference of said sun wheel and is engaged with said sun wheel;

said set of planet gears is engaged with said ring gear;

one of said sun wheel, said ring gear, and said planet carrier is non-rotationally connected to a drive shaft of said first electrical motor;

another of said sun wheel, said ring gear, and said planet carrier is disposed on said output shaft of said first transmission; and yet another of said sun wheel, said ring gear, and said planet carrier is non-rotationally connected to said support part.

12. The method of claim 11, wherein:

said support part comprises a single-row ball bearing disposed to rotationally connect said output shaft of said first transmission to said support part; and said single-row ball bearing is disposed on a side of a plane of rotation of said planet gears axially farther from said first electrical motor.

13. The method of claim 12, wherein:

said sun wheel is non-rotationally connected to said first electrical motor drive shaft;

said first electrical motor comprises a first rotor non-rotationally disposed on said first electrical motor drive shaft;

said second electrical motor comprises a second rotor non-rotationally disposed on a drive shaft of said second electrical motor;

said support part is a first support part;

said second electrical motor comprises a second support part corresponding to said second transmission;

said first support part and said second support part are connected to said auxiliary frame to connect said electrical motors to the chassis;

said first rotor is operatively rotationally connected to said first support part;

said second rotor is operatively rotationally connected to said second support part;

said first electrical motor comprises a first stator fixedly connected to said first support part;

said second electrical motor comprises a second stator fixedly connected to said second support part;

said auxiliary frame connecting to said support parts of said electrical motors is an exclusive arrangement for connecting said electrical motors to one another and said electrical motors are connected to one another exclusively by said support parts;

each of said rotors comprises a permanent magnet rotor;

each of said permanent magnet rotors has a radially inner portion and a radially outer portion;

each of said permanent magnet rotors comprises a plurality of permanent magnets disposed about said radially outer portion of a corresponding one of said rotors;

each said support parts comprises a bearing extension disposed thereupon;

each of said permanent magnet rotors is rotationally mounted at said radially inner portion on a corresponding one of said bearing extensions of said support parts;

each of said permanent magnet rotors is a permanent magnet external rotor enclosing each of said stators radially outwardly;

each of said support parts comprise a metal material;

each of said support parts is disposed in one of the following relationships (A) and (B) with respect to said external rotor:

(A) in a nonoverlapping relationship with respect to a corresponding one of said external rotors; and (B) in an overlapping relationship with respect to a corresponding one of said external rotors, such that said support part, over only a portion of its length, overlaps an area of the outside circumference of the external rotor which comprises said permanent magnets;

each of said electrical motors has an outer circumference;

said electrical motors are surrounded, at least over their outer circumferences, by a housing comprising insulating material;

said housing comprises a housing tube;

said housing tube comprises said insulating material; and said housing tube encloses said electrical motors between said support parts.

14. The method of claim 13, wherein:

each of said transmissions comprises a spur gear transmission;

said output shaft of said first transmission has an axis of rotation;

said output shaft of said second transmission has an axis of rotation; and said first electrical motor is disposed with respect to said second electrical motor so that the axis of rotation of said output shaft of said first transmission intersects the axis of rotation of said output shaft of said second transmission at a non-zero angle.

15. In a motor vehicle comprising a chassis, the chassis having a central longitudinal axis extending from a front portion to a back portion of the chassis and the chassis having an axial direction extending from a right portion to a left portion of the chassis, the axial direction being perpendicular to the longitudinal direction; the motor vehicle comprising a pair of drive wheels having a first drive wheel and a second drive wheel, one of the first drive wheel and the second drive wheel being disposed adjacent the left portion of the chassis, the other of the first drive wheel and the second drive wheel being disposed adjacent the right portion of the chassis; the motor vehicle comprising a suspension system providing a suspension connection between the drive wheels and the chassis to guide the drive wheels and to permit the drive wheels to move in at least a substantially vertical direction with respect to the chassis; the first and second drive wheels being disposed spaced apart from one another by a predetermined track distance; an electrical drive assembly comprising:

a first propeller shaft operatively connected to the first drive wheel;

a second propeller shaft operatively connected to a second drive wheel;

a first motor to drive said first propeller shaft;

a second motor to drive said second propeller shaft;

said first motor and said second motor being separate and distinct motors;

said first motor having a first transmission to transmit power to said first propeller shaft;

said first transmission having a first driven shaft part operatively connected to said first propeller shaft;

said second motor having a second transmission to transmit power to said second propeller shaft;

said second transmission having a second driven shaft part operatively connected to said second propeller shaft;

an arrangement for mounting said first motor and said second motor on a chassis with said central longitudinal axis extending therebetween, and disposing said first motor and said second motor between the first drive wheel and the second drive wheel, the first drive wheel and the second drive wheel being disposed spaced apart from one another by a predetermined track distance; and said arrangement mounting said first motor and said second motor on the chassis comprising an arrangement positioning said second motor an axial distance from said first motor to permit said second propeller shaft to be connected between said second driven shaft part and the second drive wheel and to permit said first propeller shaft to be connected between said first driven shaft part and the first drive wheel, and wherein said arrangement is further adapted to mount each of the first and second motors and the first and second transmissions at predetermined angles on the chassis such that the rotational axes of the first and second driven shaft parts of the first and second transmissions extend laterally outwardly and downwardly relative to said central longitudinal axis.

16. The motor vehicle of claim 15, wherein:

said arrangement mounting said first motor and said second motor on the chassis comprises an auxiliary frame structure mounting said first motor and said second motor on the chassis and connecting said first motor and said second motor to one another;

said auxiliary frame structure comprises said arrangement positioning said second motor an axial distance from said first motor; and said auxiliary frame structure is connected to the chassis.

17. The motor vehicle of claim 16, wherein the suspension system has a first instantaneous center of rotation about which first instantaneous center of rotation the first drive wheel pivots as the first drive wheel moves in the substantially vertical direction of the suspension system; the suspension system has a second instantaneous center of rotation about which second instantaneous center of rotation the second drive wheel pivots as the second drive wheel moves in the substantially vertical direction of the suspension system; wherein:

said first propeller shaft has an axis of rotation;

said first propeller shaft comprises a flexible coupling to permit the axis of rotation of said first propeller shaft to change angular position;

said first driven shaft part is operatively connected to said flexible coupling of said first propeller shaft;

said first propeller shaft and said auxiliary frame structure are configured to dispose said flexible coupling of said first propeller shaft substantially at the first instantaneous center of rotation;

said second propeller shaft has an axis of rotation;

said second propeller shaft comprises a flexible coupling to permit the axis of rotation of said second propeller shaft to change angular position;

said second driven shaft part is operatively connected to said flexible coupling of said second propeller shaft; and said second propeller shaft and said auxiliary frame structure are configured to dispose said flexible coupling of said second propeller shaft substantially at the second instantaneous center of rotation.

18. The motor vehicle of claim 17, wherein:

said first transmission comprises a support part;

said support part is connected to said arrangement mounting said first motor and said second motor on the chassis to thereby mount said first motor on the chassis;

said support part comprises a transmission housing disposed to house said first transmission;

said support part comprises an arrangement to rotationally support said first driven shaft part on said support part; and said flexible coupling of said first propeller shaft is supported directly on said first driven shaft part.

19. The motor vehicle of claim 18, wherein:

said electrical drive assembly comprises a first joint part connecting said first driven shaft part to said first propeller shaft to permit adjustment of said first driven shaft part so that said first propeller shaft can be connected to the first drive wheel; and said electrical drive assembly comprises a second joint part connecting said second driven shaft part to said second propeller shaft to permit adjustment of said second driven shaft part so that said second propeller shaft can be connected to the second drive wheel.

20. The motor vehicle of claim 18, wherein:

said first motor comprises a first motor drive shaft;

said second motor comprises a second motor drive shaft;

said first driven shaft part is disposed to be offset substantially axially parallel to said first motor drive shaft;

said first transmission comprises a spur gear transmission;

said first motor has a substantially cylindrical external contour disposed substantially radially outward from said first motor drive shaft;

said first driven shaft part is disposed radially inside the external contour of said first motor; and at least one of said first motor and said second motor is an external rotor electric motor.

21. The motor vehicle of claim 18, wherein:

said first transmission comprises a planetary gear transmission;

said planetary gear transmission comprises three transmission components;

said three transmission components are disposed to rotate relative to one another about a common axis of rotation;

said three transmission components comprise:
  a sun wheel;
  a ring gear; and
  a planet carrier and set of planet gears in combination;

said sun wheel is disposed centrally with respect to said ring gear and said planet carrier and set of planet gears;

said ring gear is disposed to coaxially surround said sun wheel;

said set of planet gears is disposed around a circumference of said sun wheel and is engaged with said sun wheel;

said set of planet gears is engaged with said ring gear;

one of said sun wheel, said ring gear, and said planet carrier is non-rotationally connected to said first motor drive shaft;

another of said sun wheel, said ring gear, and said planet carrier is disposed on said first driven shaft part of said first transmission; and yet another of said sun wheel, said ring gear, and said planet carrier is non-rotationally connected to said support part.

22. The motor vehicle of claim 21, wherein:

said support part comprises a single-row ball bearing disposed to rotationally connect said first driven shaft part to said support part; and said single-row ball bearing is disposed on a side of a plane of rotation of said planet gears axially farther from said first motor;

said sun wheel is non-rotationally connected to said first motor drive shaft;

said first motor comprises a first rotor non-rotationally disposed on said first motor drive shaft;

said second motor comprises a second rotor non-rotationally disposed on said second motor drive shaft;

said support part is a first support part;

said second motor comprises a second support part corresponding to said second transmission;

said first support part and said second support part are connected to said auxiliary frame structure to connect said motors to the chassis;

said first rotor is operatively rotationally connected to said first support part;

said second rotor is operatively rotationally connected to said second support part;

said first motor comprises a first stator fixedly connected to said first support part;

said second motor comprises a second stator fixedly connected to said second support part;

said auxiliary frame structure connecting to said support parts of said motors is an exclusive arrangement for connecting said motors to one another and said motors are connected to one another exclusively by said support parts;

each of said rotors comprises a permanent magnet rotor;

each of said permanent magnet rotors has a radially inner portion and a radially outer portion;

each of said permanent magnet rotors comprises a plurality of permanent magnets disposed about said radially outer portion of a corresponding one of said rotors;

each said support parts comprises a bearing extension disposed thereupon;

each of said permanent magnet rotors is rotationally mounted at said radially inner portion on a corresponding one of said bearing extensions of said support parts;

each of said permanent magnet rotors is a permanent magnet external rotor enclosing each of said stators radially outwardly;

each of said support parts comprise a metal material;

each of said support parts is disposed in one of the following relationships (A) and (B) with respect to said external rotor:
  (A) in a nonoverlapping relationship with respect to said external rotor; and
  (B) in an overlapping relationship with respect to said external rotor, such that said support part, over only a portion of its length, overlaps an area of the outside circumference of the external rotor which comprises said permanent magnets;

each of said motors has an outer circumference;

said motors are surrounded, at least over their outer circumferences, by a housing comprising insulating material;

said housing comprises a housing tube;

said housing tube comprises said insulating material;

said housing tube encloses said motors between said support parts; and each of said transmissions comprises a spur gear transmission.

* * * * *